United States Patent
Steenson, Jr.

(10) Patent No.: US 7,560,832 B2
(45) Date of Patent: Jul. 14, 2009

(54) POWER SUPPLY AND RELATED SYSTEMS AND METHODS

(75) Inventor: James H. Steenson, Jr., New Boston, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 406 days.

(21) Appl. No.: 11/093,931

(22) Filed: Mar. 30, 2005

(65) Prior Publication Data

US 2006/0227581 A1    Oct. 12, 2006

(51) Int. Cl.
*H02J 1/00*   (2006.01)
*H02J 3/32*   (2006.01)
*H01M 10/44*  (2006.01)

(52) U.S. Cl. .................. 307/66; 307/48; 320/101

(58) Field of Classification Search ............ 320/101, 320/127; 363/111; 307/66, 48, 141.4; 429/13, 429/21, 23
See application file for complete search history.

(56) References Cited

U.S. PATENT DOCUMENTS

| | | | | |
|---|---|---|---|---|
| 3,181,466 A | * | 5/1965 | Czajkowski | 102/206 |
| 3,592,697 A | * | 7/1971 | Braun | 429/63 |
| 3,689,776 A | * | 9/1972 | Evans | 307/66 |
| 3,890,900 A | * | 6/1975 | Gould, Jr. | 102/207 |
| 4,372,212 A | * | 2/1983 | Hoelzen et al. | 102/264 |
| 5,708,348 A | * | 1/1998 | Frey et al. | 320/145 |
| 6,462,507 B2 | * | 10/2002 | Fisher, Jr. | 320/101 |
| 7,420,295 B2 | * | 9/2008 | Omae et al. | 307/66 |

* cited by examiner

*Primary Examiner*—Akm E Ullah
*Assistant Examiner*—M'baye Diao
(74) *Attorney, Agent, or Firm*—Daniel J. Long; Bryan Santarelli; Graybeal Jackson LLP

(57) ABSTRACT

A power supply includes a power source having first and second terminals. A circuit is coupled to the source and is operable to maintain a first quantity between the terminals within a predetermined range of values until a second quantity between the terminals has a predetermined value. Such a power supply provides the ability to delay activating a load until the current that the supply can provide is at a level acceptable for proper load function.

20 Claims, 2 Drawing Sheets

POWER SUPPLY AND RELATED SYSTEMS AND METHODS

GOVERNMENT LICENSE RIGHTS

The U.S. Government has a paid-up license in this invention and the right in limited circumstances to require the patent owner to license others on reasonable terms as provided for by the terms of Contract No. DAAH01-03-C-0010 awarded by US Army.

BACKGROUND

Thermal batteries are often used to power the circuitry in certain devices, such as missiles. Specifically, after activation, the battery powers, e.g., the electronic control circuitry and the motors that steer the missile.

A thermal battery is activated by igniting an internal portion of the battery. Upon ignition, the battery commences current and voltage production.

But unfortunately, upon activation, a thermal battery has a high equivalent series resistance (ESR)—typically on the order of tens of giga-ohms—which reduces the voltage level that the battery is able to generate across a load. Although the ESR reduces to a suitable value within a time typically on the order of ¼ to ¾ seconds, if the circuitry activates before the ESR is low enough—typically less than one ohm—and, thus, the output voltage high enough, the circuitry may initialize in an undesirable state or may otherwise malfunction. And if the circuitry malfunctions, it may cause a malfunction in the device, e.g., a missile, that incorporates the circuitry.

FIG. 1 is a schematic block diagram of a conventional device 10, which is a vehicle, such as a missile, having at least one load, such as a motor 20 and electronic circuitry 30, and a power source 35, including a thermal battery 40 with associated ESR 50. The motor 20 and electronic circuitry 30 are coupled to and receive a supply voltage Vs from the battery 40 via conductors 60 and 62. The assembly for igniting the battery is omitted for clarity.

Typically, the electronic circuitry 30 operates in a reset mode when the supply voltage Vs is between a minimum operational level and a reset level, e.g., 0.5 Volts (V), and is fully operational when Vs is greater than the reset level. But if while the circuitry 30 is fully operational Vs falls below the reset level, then the circuitry re-enters the reset mode. Unfortunately, the circuitry 30 re-entering the reset mode may delay the start-up time for the missile 10, or may cause the missile to malfunction.

More specifically, upon activation at missile-launch time, the battery 40 begins providing the supply voltage Vs to the motor 20 and electronic circuitry 30, which typically requires minimal current (on the order of a few milliamps) to reset itself, exit the reset mode, and perform, for example, pre-launch system checks. Consequently, because the circuitry 30 presents a relatively small load to the battery 40, Vs typically exceeds the circuitry's reset level relatively quickly, thus allowing the circuitry to become fully operational and perform the pre-launch routine within a few milliseconds after the battery 40 is activated. However, the motor 20, when operating, draws a relatively large amount of current on the order of 10 Amps, and thus presents a relatively large load to the battery 40. Therefore, if the circuitry 30 activates the motor 20 before the ESR 50 has fallen to a suitably small value, then the load presented by the motor 20 may cause Vs to fall below the reset level of the circuitry 30, which, as discussed above, causes the circuitry 30 to re-enters its reset mode. Unfortunately, the circuitry 30 re-entering its reset mode may undesirably delay or abort the launch of the missile 10.

SUMMARY

In an embodiment of the invention, a power supply includes a power source having first and second terminals. A circuit is coupled to the source and is operable to maintain a first quantity between the terminals within a predetermined range of values until a second quantity between the terminals has a predetermined value.

Such a power supply provides the ability to delay activating a load until the current that the supply can provide is at a level acceptable for proper load function.

DETAILED DESCRIPTION

Figure 1:
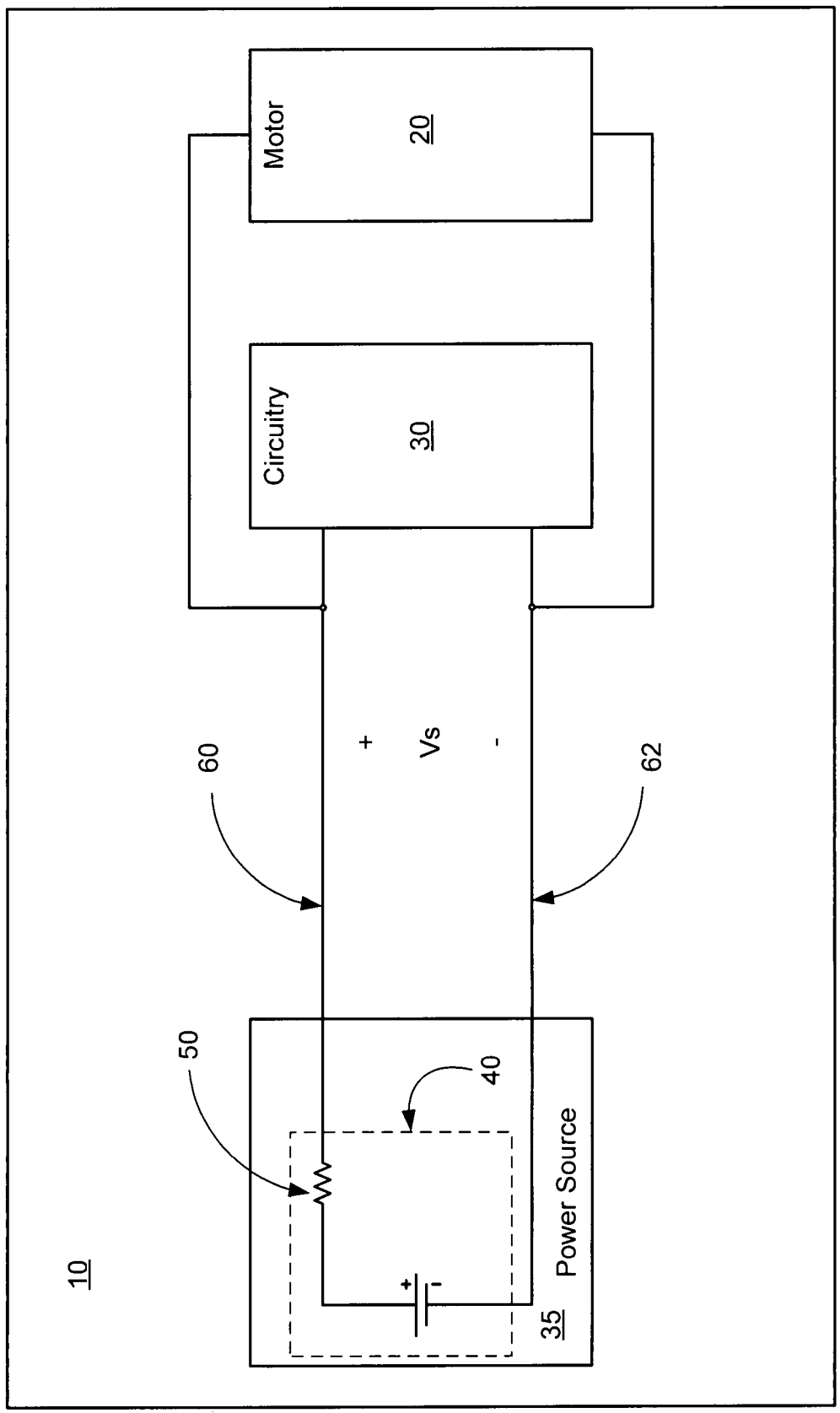
FIG. 1 is a schematic block diagram of a conventional device.
Figure 2:
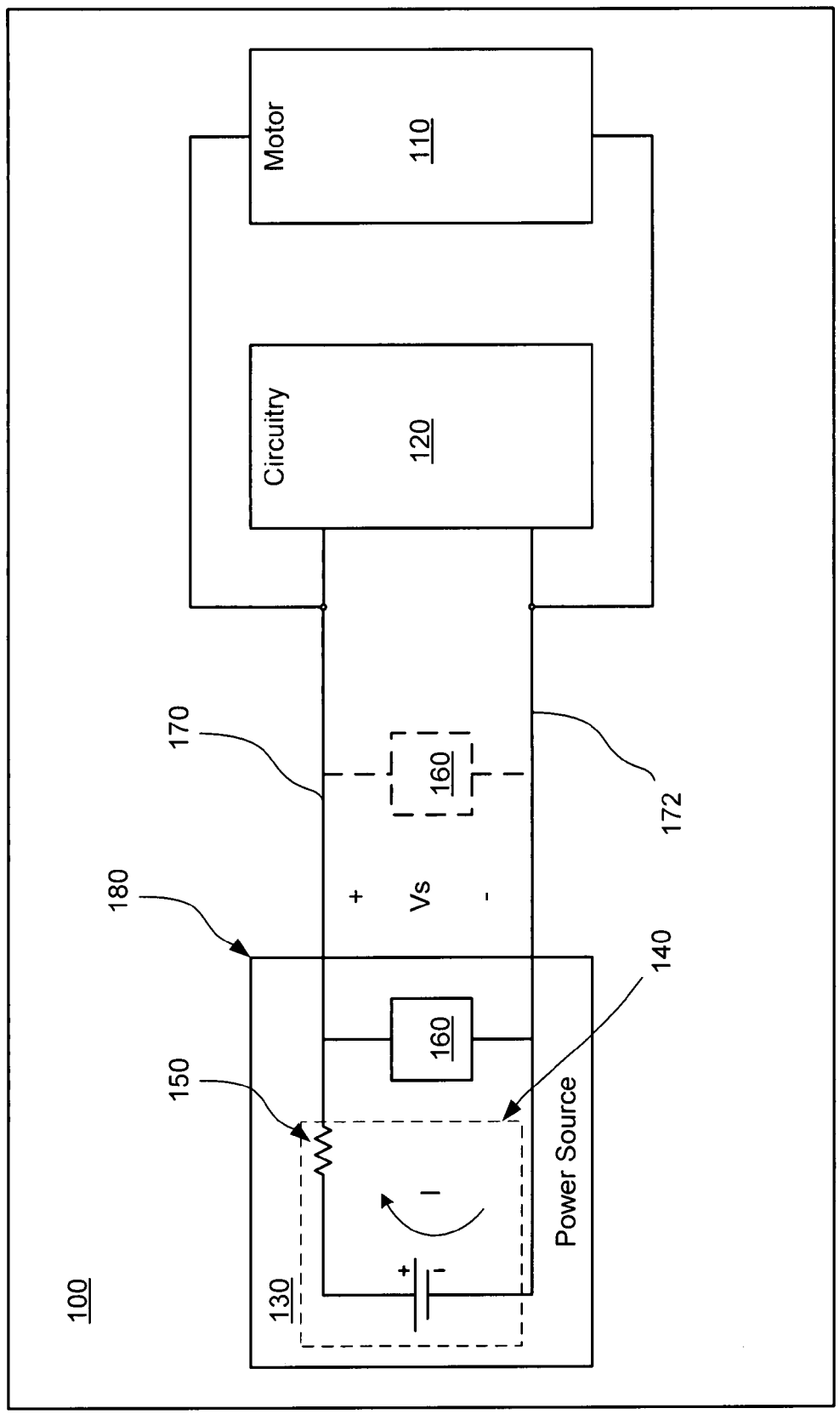
FIG. 2 is a schematic view of a device according to an embodiment of the invention.

FIG. 2 is a schematic block diagram of a device 100, such as a missile, which, according to an embodiment of the invention, includes a motor 110, electronic control circuitry 120, and a power supply 130 that includes a power source 140, such as a thermal battery with associated ESR 150, and a supply-activation circuit 160 such as a fuse. The motor 110 and electronic control circuitry 120 are coupled to and receive a supply voltage Vs from the power supply 130 via conductors 170 and 172.

The supply-activation circuit 160 prohibits Vs from increasing above the reset voltage level of the control circuitry 120 until the ESR 150 reduces to a value ESRdesired that is low enough to allow the supply 130 to maintain Vs above the reset level while powering the control circuitry, the motor 110, and any other load coupled to Vs.

According to Kirchov's voltage and current laws:

$$Vs = Vi \times R160/(ESR + R160) \quad (1)$$

$$I = Vi/(ESR + R160) \quad (2)$$

where Vi is the internal voltage of the battery 140 and R160 is the equivalent resistance of the circuit 160 and is small enough, e.g., often less than an ohm, such that the impedances presented by the control circuitry 120 and the motor 110 can be ignored. As the value of ESR 150 falls toward ESRdesired after the activation of the battery 140, Vs and I both increase until:

$$Vs_{activate} = Vi \times R_{160}/(ESR_{desired} + R_{160}) \quad (3)$$

$$I_{activate} = Vi/(ESR_{desired} + R_{160}) \quad (4)$$

Because Vi, ESRdesired, and R160 are known quantities, then Iactivate and Vsactivate are also known.

Consequently, the circuit 160 is designed to transistion from a relatively low impedance to a relatively high impedance, e.g., on the order of Megaohms or Gigaohms, in response to I=Iactivate and/or Vs=Vactivate per equations (3) and (4).

For example, the circuit 160 may be a fuse designed to blow when the current through it equals Iactivate. Before the fuse blows, Vs has a level on the order of 0 V to a few hundred mV. Once the fuse blows, the value of ESR 150 is low enough such that Vs becomes greater than the reset voltage level of the circuitry 120 and remains greater than the reset voltage level even after the motor 110 is activated. Consequently, the circuitry 120 is significantly less likely to re-enter its reset mode when the motor 110 is activated, thus reducing the chances that the circuitry will delay or abort the launch of the missile 10.

Still referring to FIG. 2, the operation of the missile 10 during a launch sequence is discussed where the circuit 160 is a fuse.

First, an igniter (omitted from FIG. 2 for clarity) activates the battery 140. Because the fuse 160 is electrically closed, Vs~0 V. If Vs is large enough to power the circuitry 120 in its reset mode, then the circuitry 120 resets itself. If Vs is not large enough, then the circuity 120 is inactive.

Next, the value of the ESR 150 begins decreasing while the fuse 160 remains electrically closed and Vs remains ~0 V.

Then, when the value of ESR 150 equals or falls below ESRdesired, the fuse 160 blows (i.e., electrically opens), and Vs rises to a level above the reset level of the circuitry 120. If the circuitry 120 has not previously reset itself, then it does so now before becoming fully operational.

Next, the circuitry 120 executes its pre-launch routine, activates the motor 110, and launches the missile 10.

The power supply 130 comprises a housing 180 in which the battery 140 is disposed, and the circuit 160 is disposed within the housing 180. Alternatively, the circuit 160 may be disposed outside of the housing 180 as indicated in FIG. 2 by dashed lines.

Although described as being a fuse that is connected across the terminals 170 and 172 of the missile power supply 130, other embodiments of the circuit 160 are contemplated. For example, the circuit 160 may include a one or more interconnected semiconductor components such as transistors, and may be reusable—a fuse, once blown, is typically not reusable. Furthermore, the circuit 160 may transition from a low to a high impedance in response to Vs in addition to or instead of in response to I. Moreover, the circuit 160 may be connected in a topology other than directly across the supply terminals 170 and 172. In addition, the circuit 160 may be used in devices other than missiles.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. For example, it should be recognized that all operations described herein could be applied to any device employing a load that, to function properly, requires a minimum sustained voltage applied to the load. Thus, the present invention is not intended to be limited to the embodiments shown, but is to be accorded the widest scope consistent with the principles and features disclosed herein.

What is claimed is:

1. A power supply, comprising:
 a power source having first and second terminals; and
 a circuit coupled to the source and operable
  to maintain a magnitude of a voltage between the terminals within a first predetermined range of values until a first quantity has a predetermined value, and
  to maintain the magnitude of said voltage within a second predetermined range of values after the first quantity has the predetermined value, the values within the second predetermined range being greater than the values within the first predetermined range.

2. The power supply of claim 1 wherein the first quantity comprises a current flowing between the terminals.

3. The power supply of claim 1 wherein the first quantity comprises an equivalent series resistance of the power source.

4. The power supply of claim 1 wherein:
 the first range includes values that are approximately zero; and
 the second range includes values that are greater than zero.

5. The supply of claim 1 wherein the power source comprises a battery.

6. The supply of claim 1 wherein the circuit comprises a fuse.

7. The supply of claim 1 wherein the power source comprises a thermal battery.

8. A system, comprising:
 a load having an operational voltage range; and
 a power supply including
  first and second power-supply terminals coupled across the load, and
  a circuit coupled to the terminals and operable
   to maintain a voltage between the terminals outside of the operational voltage range while the magnitude of a current through the circuit is greater than zero but below a threshold level, and
   to allow the voltage between the terminals to be within the operational voltage range after the magnitude of the current through the circuit exceeds the threshold level.

9. The system of claim 8 wherein the operational voltage range is greater than approximately 0.5 volts.

10. The system of claim 8 wherein the load comprises a motor.

11. The system of claim 8 wherein the load comprises control circuitry.

12. The system of claim 8 wherein the circuit is operable to maintain the voltage between the terminals at approximately zero volts while the current through the circuit is below the threshold level.

13. A method, comprising:
 activating a power source having first and second terminals and an equivalent series resistance;
 maintaining inactive a load coupled across the terminals of the activated power source while a current of non-zero magnitude flows between the terminals, at least until the resistance decreases to a threshold value; and
 allowing the load to activate after the resistance decreases below the threshold value.

14. The method of claim 13 wherein:
 the load has a load impedance; and
 maintaining the load inactive comprises maintaining across the terminals an impedance that is significantly smaller than the load impedance.

15. The method of claim 13 wherein:
 the load has a load impedance; and
 allowing the load to activate comprises causing an impedance across the terminals to significantly exceed the load impedance.

16. The method of claim 13 wherein maintaining the load inactive comprises preventing a current sufficient to activate the load from flowing through the load.

17. A method, comprising:
 activating a power source having first and second terminals; and preventing the activation of a load coupled to the first and second terminals of the activated power source while a current of non-zero magnitude flows between the terminals until an electrical quantity between the terminals has a predetermined value.

18. The method of claim 17 wherein the quantity comprises the current flowing between the terminals.

19. The method of claim 17 wherein the quantity comprises a voltage across the terminals.

20. The method of claim 17 wherein the quantity comprises an equivalent series resistance of the power source.

* * * * *